CONTROL SYSTEM FOR AUTOMOBILE AIR CONDITIONERS

Original Filed Dec. 21, 1964 3 Sheets-Sheet 1

CONTROL SYSTEM FOR AUTOMOBILE AIR CONDITIONERS

Original Filed Dec. 21, 1964 3 Sheets-Sheet 2

CONTROL SYSTEM FOR AUTOMOBILE AIR CONDITIONERS

Original Filed Dec. 21, 1964 3 Sheets-Sheet 3

United States Patent Office

Re. 27,699
Reissued July 17, 1973

27,699
CONTROL SYSTEM FOR AUTOMOBILE AIR CONDITIONERS

Richard S. Weaver, Timonium, and John M. Miller and Michael Slavin, Towson, Md., assignors to The Bendix Corporation Original No. 3,315,730, dated Apr. 25, 1967, Ser. No. 420,061, Dec. 21, 1964. Application for reissue Aug. 9, 1971, Ser. No. 170,159
Int. Cl. B60h *3/00*
U.S. Cl. 165—23 11 Claims

Matter enclosed in heavy brackets [ ] appears in the original patent but forms no part of this reissue specification; matter printed in italics indicates the additions made by reissue.

*ABSTRACT OF THE DISCLOSURE*

*An automatic control system for controlling the cooling or heating output of an automobile air conditioner which combines in various proportions cooled air from an engine driven mechanical refrigeration system with warm air from a heater through which engine coolant is circulated, to achieve a controllable air temperature. An actuator powered by engine manifold vacuum controls the speed of a blower and positions a blend door which diverts portions of cooled air through the heater, the discharge air being formed by the mix of undiverted cooled air with heated air. Electrical signals representing selected, ambient and in-car temperatures are combined with an electrical signal representing the output position of the actuator in an amplifier, the output of which controls a transducer modulating the vacuum applied to the actuator, thereby providing closed loop automatic control of the automobile interior air temperature.*

The present invention relates to air conditioning systems for automobiles. More particularly, it relates to a system for automatically controlling the heating or cooling of air by an automobile air conditioner to maintain constant a selected in-car temperature.

A full range automobile air conditioning system is required not only to cool warm air during hot weather, but to warm cold air in other seasons. It is also desirable to dehumidify the air whether heating or cooling is required. The presence of a plentiful source of heat from the engine cooling system makes the reheat method of dehumidification attractive. In this cycle the air conditioner evaporator is operated at minimum practical temperature, usually 32° F., which cools the air well below a comfortable temperature but in so doing condenses substantial amounts of water vapor. When this cooled, saturated air is warmed to a comfortable temperature, the relative humidity will be decreased. There are obviously a number of ways in which the final comfortable temperature may be reached. All air entering the car can be made to pass through the air conditioner evaporator, thence through the heater core before it is discharged into the passenger compartment. The final temperature may be controlled by varying the temperature of the air conditioner evaporator with a hot gas control valve, or by varying the temperature of the heater core by means of a hot water control valve, or both. Another variation in the reheat cycle is first to cool all incoming air to a minimum temperature, then to extract a portion of this cooled air and pass that air through the heater core which is operated at maximum temperature, and finally to achieve a comfortable temperature by blending the heated portion of the air with the remainder of the cooled air. The final comfortable temperature is achieved in this case by varying the proportions of hot and cold air.

It will be appreciated that with cooling temperature, heating temperature, and air proportions as variables, manual control of an air conditioning system is impractical. An automatic control system achieves the final temperature by manipulating the system variables as would be done with manual control. That is, if the system is of the air-blend type, a manual operation might be, on a warm day, first to set the blend control to deliver cold air alone. In time, the interior temperature will drop below a comfortable level and readjustment of the blend control to add warm air is necessary. Almost certainly, the result of the second adjustment will be to raise the temperature again above a comfortable level. Again an adjustment is made toward the cold side and perhaps still another adjustment toward the warm side may be required before the desired temperature is reached. And then still another variable in the form of changing ambient temperature outside the vehicle can cause further need for adjustment. An acceptable automatic control receives as a command the temperature desired by the passengers. It senses the actual car temperature and adjusts system variables in a direction to reduce the difference between the command temperature and the actual temperature. It further anticipates future control requirements by sensing the ambient temperature outside of the vehicle. The most sensitive means of measuring temperature are electrical devices. Control of the air conditioning system is invariably by mechanical means. The control system ought, therefore, be capable of accepting electrical input signals and converting these into appropriate mechanical motions for controlling the air conditioning system variables.

One of the objects of the present invention is to provide a control in which a given set of electrical input conditions produces a known and consistent mechanical output displacement for adjusting the variables of an automotive air conditioning system.

Another object of the invention is to provide an automatic control adaptable to operation with various treatment cycles of air conditioners.

Still another object of the invention is to provide an automatic air conditioner control which is not sensitive to voltage variation, changes in engine speed, or similar changing conditions in an automobile.

A further object of this invention is to provide an automatic control for an automobile air conditioner which is free from changes in calibration due to the effects of age.

Since the electrical systems of automobiles are direct current and a convenient source of motive power is the engine manifold vacuum, more specific objects of the invention include the provision of a control using DC amplifiers designed to minimize drift in the operating point normally associated with such amplifiers.

Another specific object is to provide a control system which linearly proportions vacuum in response to electrical signals for operating a main actuator, refrigerant throttle valves, etc. according to a predetermined cycle.

A further object is to provide a control system powered by engine vacuum and which makes demands for power only at such times as a change in the output of the controlled system is required.

Another specific object of the invention is to provide an automatic control for an automobile air conditioner which includes an electrical position feedback loop within the main thermal feedback loop for increased reliability and consistency of operation of the system, as well as to reduce to a minimum production problems of selection and calibration of system components.

Other objects and advantages of the invention will be apparent as an understanding of its construction and operation is gained through study of the following detailed description and the accompanying drawings.

Briefly, the invention comprises a vacuum operated actuator connected to control the air conditioner output as a function of the actuator position. The actuator position depends upon the pressure transmitted thereto by a vacuum modulator. The modulator includes a hermetic housing with valves to a vacuum line and to the atmosphere. The valves are operated by an amplifier which combines an electrical temperature signal with an electrical signal representing the output position of the actuator.

Figure 1:
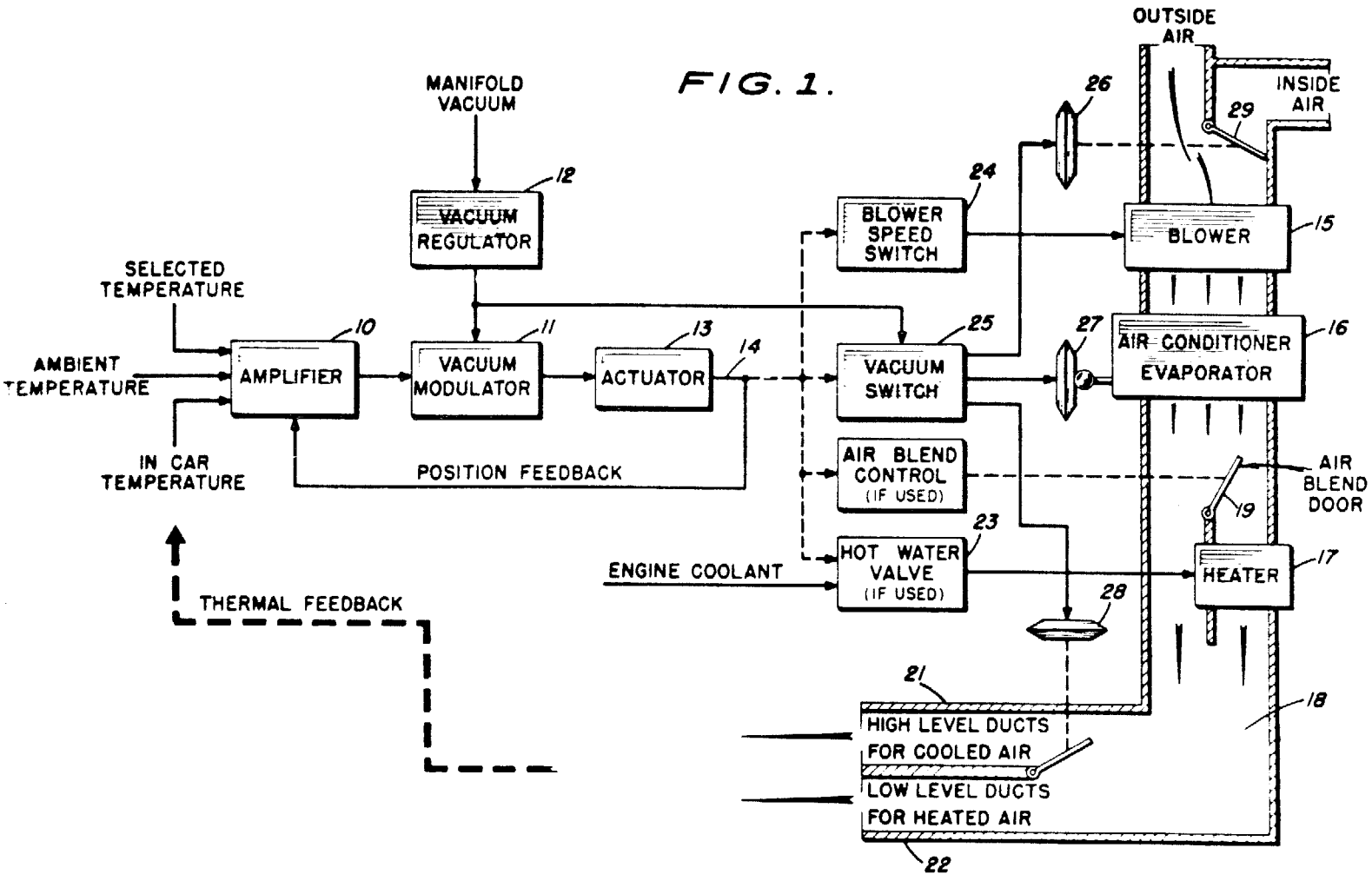
FIG. 1 is a functional block diagram of an automobile air conditioning system incorporating the invention.

The block diagram of FIG. 1 incorporates features of both of the above mentioned systems of air treatment. It will be understood that in many systems certain of the elements of FIG. 1 will be in the alternative. An amplifier 10 combines input signals representing the selected or command temperature, the ambient outside temperature, and the in-car temperature with a feedback signal representing the position of a control arm. The output of amplifier 10 is an electrical error signal which controls a vacuum modulator 11. The engine intake manifold vacuum is the source of control power for the system. The variations in vacuum due to changing engine loads, however, must first be smoothed out in a vacuum regulator 12 before being proportioned in accordance with the error signal output in the modulator 11, or controlled lated vacuum from the modulator 11, or controlled negative pressure, to be more exact, causes an actuator piston 13 to position a control arm 14 which selects and proportions the variables of the air conditioning system in such way as to cause the in-car temperature to approach the selected temperature.

Passing now to the air flow portion of the system, the aid to be conditioned is taken from outside the car, except in extreme temperature conditions, to a variable speed blower 15 and impelled thence through the air conditioner evaporator 16 for cooling to the temperature of that exchanger. Then according to the type of air treatment in the system, all air may pass through a heater 17 for warming to comfort temperature, the added heat being controlled by varying the water flow through the heater, or a quantity of cooled air may be passed through the heater 17 and later mixed with the remainder of cooled air in a chamber 18. The comfort temperaturue in this case is achieved by controlling the proportions of warm and cold air through an air-blend door 19. Except for extreme demand of cooling, the heater 17 is always operated at maximum temperature. Air from the chamber 18 is discharged into the passenger compartment through high level ducts 21 if the system is functioning to cool the air below ambient, or through low level ducts 22 if the system is warming the air. The difference in elevation of the discharge ducts 21 and 22 has been found to promote gravity circulation of the air inside the car and to achieve a greater degree of passenger comfort.

The change in in-car temperature produced by adding or extracting heat from the ambient air is reflected by a change in the in-car temperature signal applied to amplifier 10. This in turn calls for a new portion of control arm 14, either to add more heat or extract more heat, but always in a direction converging upon a value of in-car temperature which equals the selected temperature.

The system variables determined by the position of the control arm 14 are principally the position of a hot water flow valve for a system of the first type or the position of an air-blend door for a system of the second type. In addition, the heat quantity and system response time are dependent upon air mass flow and this quantity is determined by the speed of blower 15. A blower speed switch 24 is therefore linked to control arm 14 to provide maximum blower speed at the extremes of the control arm position, whether heating or cooling is demanded, with minimum blower speed being selected for a control arm position corresponding to the heat requirements for average ambient conditions. Control arm 14 also actuates a vacuum switch at various intervals in its travel to control subsidiary vacuum actuators 26, 27, and 28. These actuators are not proportional devices but are either fully off or on, depending upon the presence or absence of applied vacuum. The purpose of the subsidiary actuators is to alter the circulation of air or to disengage some element under particular ambient conditions. The control arm 14 travels from one extreme position representing maximum cooling demand to another extreme position representing maximum heating demand. At either extreme position of the arm it is desirable to commence recirculating the inside air for more rapid change of in-car temperature. Therefore, the vacuum switch 25 would be linked to control arm 14 to turn on actuator 26 at either of the limits of travel of the arm and thereby switch door 29 into position to close off the entry of outside air. Over that portion of arm travel representing heating demand, the vacuum switch 25 would turn on actuator 28 to cause air to be delivered from the low level ducts 22. Under certain conditions of operation, it may be desirable to throttle refrigerant gas from evaporator 16. Switch 25 may, therefore, turn on actuator 27 at appropriate positions of the control arm. Still other operations may be provided by subsidiary vacuum actuators, such as control of the air conditioner compressor clutch, defroster duct vents, etc.

Figure 2:
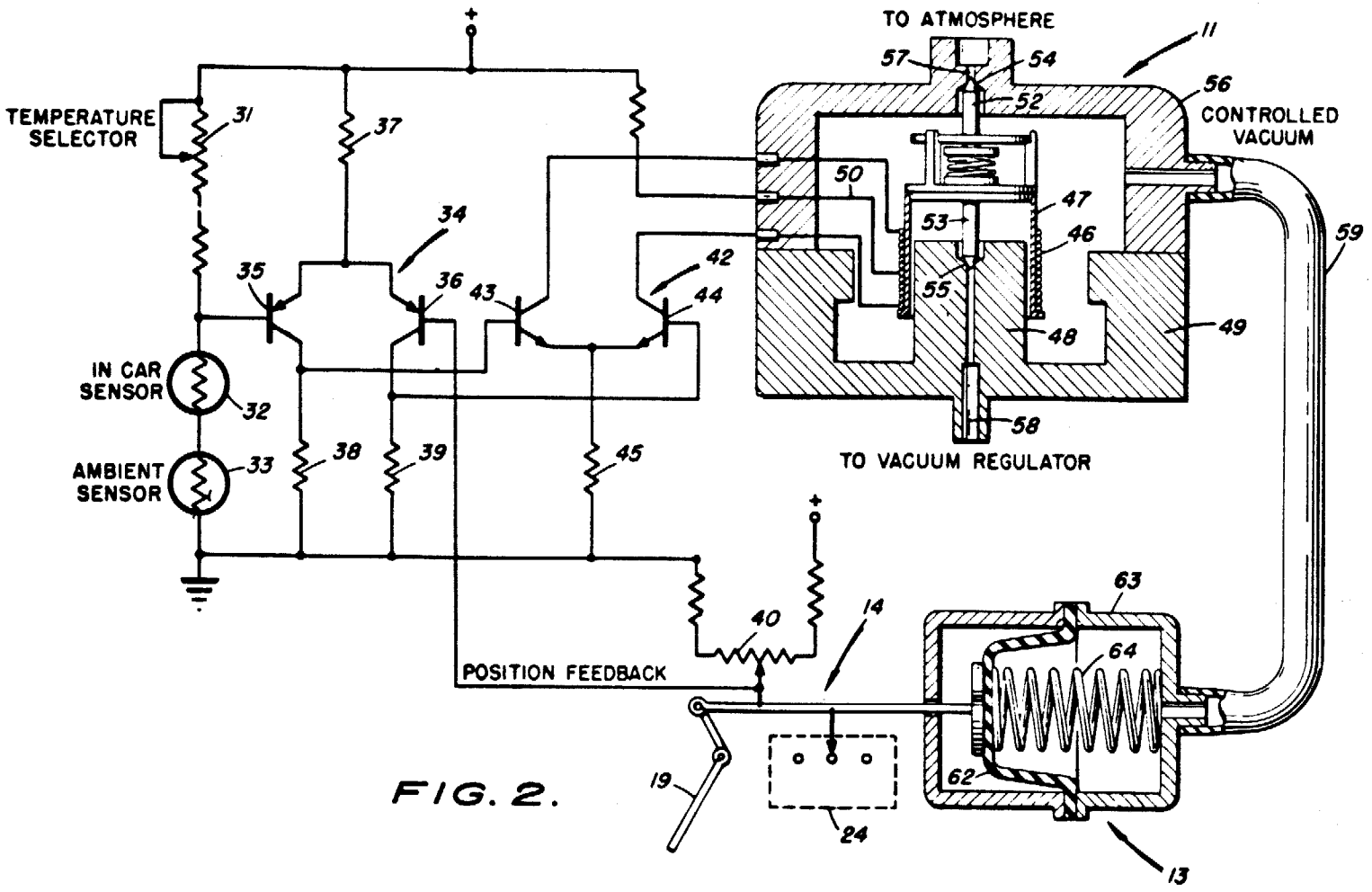
FIG. 2 is a schematic diagram of the control system of the invention.

The control system of the invention including elements 10, 11 and 13 is shown schematically in FIG. 2, to which reference is now made. The signals representing the selected, in-car and ambient temperatures are combined in a voltage divider which includes an adjustable rheostat 31, calibrated in terms of the desired in-car temperature, connected in series with a thermistor 32 exposed to the temperature of the passenger compartment and a thermistor 33 exposed to outside ambient air temperature. Thermistors 32 and 33 respond to temperature variations by changing resistance. Thermistors 32 and 33 need not have the same resistance value at the same temperature nor, indeed, seldom will they have the same function for resistance change with temperature change. The choice of the characteristics of these thermistors is determined by various response characteristics of the air conditioning system. Reckoning therefore that full advantage will be taken of control of the air conditioning system response by selection of thermistor characteristics, it is clear that a combination of any particular input temperatures will result in the appearance of a particular voltage on the high side of thermistor 32. For example, assume that the selected temperature, the in-car and ambient temperatures are all equal. The sole function of the air conditioning system is then that of dehumidification. An identical amount of reheat should be added to the cooled incoming air to result in zero heat gain or loss. The voltage at the high side of thermistor 32 may then be taken as the signal command for a neutral output position of control arm 14. If now the ambient temperature should decrease, the resistance of thermistor 33 would increase, thus producing increased voltage at the high side of thermistor 32 without change in in-car temperature. With colder entering air the in-car temperature would soon likewise decrease, causing a need for heat gain in the system in order to maintain the selected temperature. Therefore, increased voltage at the high side of the thermistor 32 should cause control arm 14 to move to a position which delivers either a greater amount of heated air to the air-blend chamber or additional flow of hot water to the heater. Since this same demand is signaled by the ambient sensor before change of in-car temperature some compensation is made for the thermal lag of the system.

The voltage at the high side of thermistor 32 is applied as one input to a differential amplifier consisting of two similar transistors 35 and 36 coupled together with a common emitter resistor 37. A second input to amplifier 34 is derived from a position feedback potentiometer 40, the arm of which is mechanically linked to control arm 14 to provide a voltage linearly proportional to the control arm position. Transistors 35 and 36 feed equal load resistors 38 and 39. The output of amplifier 34 is measured as the difference between the voltages across loads 38 and 39 and is equal to the amplified difference between the input voltages applied to the bases of transistors 35 and 36. A second differential amplifier 42 provides this difference and increases the power thereof using a pair of similar transistors 43 and 44 coupled through a common emitter resistor 45. Differential load currents will thus appear in the collector circuits of transistors 43 and 44 which are proportional to the difference between the input voltages of transistors 35 and 36. These differential currents operate an electromechanical transducer which controls the position of needle valves to adjust the vacuum within the vacuum modulator 11. The differential currents from amplifier 42 operate the transducer in a push-pull manner by the connection of its collectors to opposite ends of a center-tapped coil 46, the center-tap of which is connected to the positive voltage source. Coil 46 is wound upon a bobbin 47 centered on an axial pole piece 48 of an annular magnet 49. Coil 46 is immersed in the radial field of magnet 49 so that equal currents flowing from the center-tap 47 through opposite halves of the coil winding exert oppositely directed forces upon the bobbin 47, tending to equalize its position vertically within the magnet field. An unbalance in the differential currents of opposite halves of the coil winding resulting from a difference between the input voltages to amplifier 34 results in an increase of force above the quiescent force for one-half of the winding and equal decrease in force below the quiescent force for the other half of the winding. The resultant of the differential currents is therefore a force which is proportional to the algebraic difference between the currents. That is, the resultant is a force having a magnitude proportional to the sum of the magnitudes of the differential currents and a direction towards that half of the winding carrying the larger current.

A pair of spring loaded needle valves 52 and 53 are captured by superstructure on the bobbin 47 with sufficient clearance to permit both valves to seat in vents 54 and 55 at the equilibrium bobbin position. When currents in the opposite halves of the winding of the coil 46 become unbalanced, the bobbin 47 moves from the equilibrium position in the direction of the coil half carrying the greater current to take up the clearance and unseat one of the valves while maintaining the other valve closed. The valves, coil, and magnet are enclosed in a hermetic housing 56 with channels 57 and 58 respectively connecting vents 54 and 55 to the atmosphere and to the vacuum source 12 of FIG. 1. Consequently, unseating one or the other of valves 52 or 53 either raises or lowers the pressure within housing 56 while existing pressure is maintained by seating both valves. A third channel 59 communicates the internal pressure of housing 56 to the vacuum actuator 13.

The actuator 13 comprises an expansible chamber formed with a flexible rubber diaphragm 62 sealed to a hermetic shell 63 and enclosing a force spring 64. Control arm 14 is secured to the atmospheric side of diaphragm 62. A reduction of pressure below atmospheric within the chamber of actuator 13 collapses the chamber to a point where the compressive force of spring 64 balances the force due to the pressure difference across diaphragm 62. When the pressure within the chamber of actuator 13 is at atmospheric spring 64 is extended fully and control arm 14 is in one extreme position of its travel. This position may be that demanding maximum heating or cooling, depending upon the manner in which the control arm is linked to control the variables of the air conditioning system. When the pressure within the chamber of the actuator 13 has been reduced to the minimum obtainable with the regulated vacuum source, spring 64 is compressed to the fullest possible extent and control arm 14 will be in its other extreme position demanding an output from the air conditioning system opposite that of the first extreme position. From one extreme position to the other of control arm 14 the voltage output of potentiometer 40 varies from minimum to maximum. This range embraces the voltage range of the temperature error signal which results from the combination of the selected, in-car, and ambient temperature signals. When control arm 14 is in a position causing the output of the air conditioning system to be something other than that demanded to satisfy the temperature error signal at the base of transistor 35, the voltage from the feedback potentiometer 40 to the base of transistor 36 will be different from the input of transistor 35 and thus produce a differential current in coil 46 of the modulator 11. This will cause the proper one of the modulator needle valves to unseat, adjusting the pressure within the modulator and the expansible chamber of actuator 13 and causing movement of the control arm 14 in the proper direction to adjust potentiometer 37 for an output voltage approaching equality with the temperature error voltage. When that position is reached, the differential currents in coil 46 will be zero and bobbin 47 will return to a position permitting both needle valves of the modulator to seat. The pressure within the modulator and the expansible chamber of actuator 13 stabilizes at a new value. Further control arm movement is unnecessary, at least until altered in-car temperature results in a new temperature error signal, and no further demands for vacuum power are made.

The response of actuator 13 is much more rapid to a change in applied vacuum than is the temperature of the air to changes of heat produced by the air conditioning system. Consequently, the closed position feedback loop of the control system of the invention causes the air conditioning system to adjust in-car temperature automatically with a minimum amount of over-shoot in the control arm position and less fluctuation in the in-car temperature as it approaches equality with the selected temperature. Over-shoot in the control arm position is disquieting to the passengers since it is most noticeable by causing the blower speed to step-up to maximum. The temperature fluctuations resulting from changes in the heat output of the air conditioning system are considerable smoothed by the long time constant of the thermal feedback loop and seldom discomfort the passengers. Blower speed fluctuations, however, are immediately noticed as an increase in noise level from one tolerable to conversation or radio listening to one in which such pursuits become difficult. In partial compensation for such over-shoot in blower speed, prior control systems incorporated a considerable amount of dead space or lost motion in the linkage coupling the control arm to the blower speed switch. Dead space might also be used to advantage in the switch linkage of the present invention, but not for the purpose of compensating for control arm over-shoot. As presently constructed, blower speed controls simply comprise several resistors of discrete value which are inserted by the speed switch in series with motor power supply. Thus the blower speed is varied in steps rather than continuously so that a tight linkage between the control arm and the blower speed switch could result in several positions of the control arm travel at which the blower speed is multi-valued. In the absence of a continuously variable blower speed control, linkage dead space can be used to eliminate blower speed instability.

Figure 3:
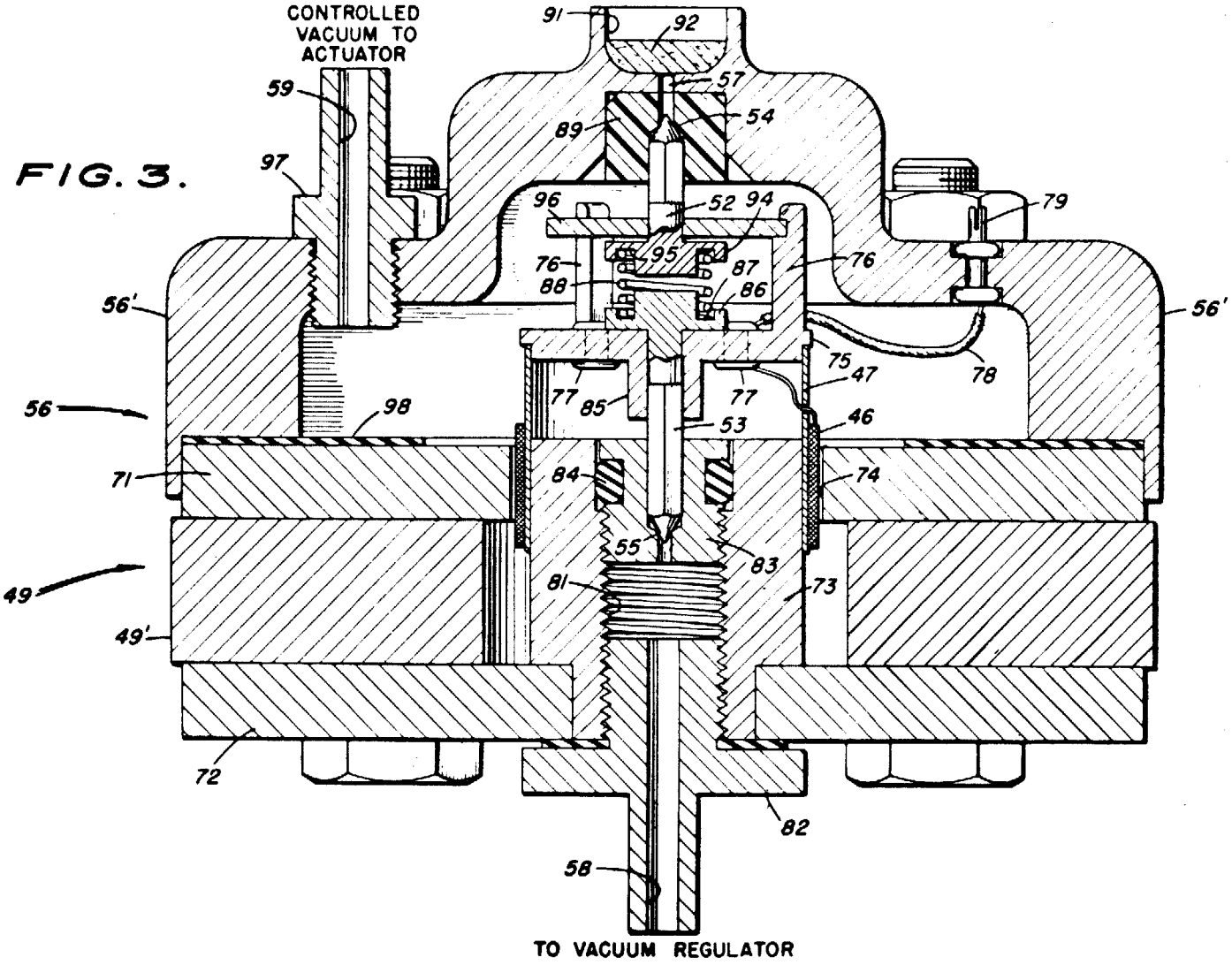
FIG. 3 is a section of a practical embodiment of the vacuum modulator of the invention.

The construction and operation of the invention may be readily ascertained from the preceding FIGS. 1 and 2 and the descriptive portions of the specification. Details of the vacuum modulator are shown in FIG. 3, to which reference is now made. The hermetic housing 56 of the modulator is constructed of a molded plastic top portion 56' closely fitted to the annular magnet 49. The magnet 49 is constructed of a ring 49' of magnetic material to which top and bottom soft iron disks 71, 72 are fixed. A cylindrical center pole piece 73 is press fitted into an axial hole passing through disk 72 and extends upward through a larger diameter hole in disk 71. Clearance between pole piece 73 and the axial hole of disk 71 provides a magnetic gap 74 within which the transducer coil 46 operates. Coil 46 consists of many turns of fine wire wound upon a split aluminum bobbin 47. A shouldered disk 75 having upright standards 76 integrally formed thereon is secured to the upper end of bobbin 47. The ends of the winding of coil 46 and the center-tap 50 are brought up to electrical contacts in the form of rivets 77 and secured there by soldering. Flexible wires 78 connect the rivets 77 to terminals 79 sealed in the housing 56'. The coil 46, bobbin 47 and disk superstructure 75 are thus free to move under the influence of the magnetic fields generated by the external electrical connections to terminals 79. An axial bore 81 is passed through pole piece 73 and is sealed at the external end by a tubing adapter 82 to which is attached a vacuum hose as an extension of channel 58. A valve seat insert 83 closes the internal end of bore 81 with a tight vacuum seal being insured by a close press fit of the insert into the bore and an O-ring gasket 84. A conical valve seat 55 is carefully machined into the lower end of insert 83 to cooperate with the lower needle valve 53. The lower end of needle valve 53 is finished with a triangular section and a conical point which engages seat 55 to seal off the interior of the modulator from the regulated vacuum channel 58. Needle valve 53 is guided in insert 83 by the close fit of the peripheral edges of the triangular portion of the valve to the surrounding wall of the insert. Upon retraction of the point of valve 53 from seat 55 communication between the vacuum channel 58 and the interior of the modulator is provided along the flat sides of the triangular portion. The upper portion of the valve 53 is of circular cross-section fitted for easy sliding movement within an axial hub 85 on a disk 75. The upper end of valve 53 is shaped with a flange 86 having a circular groove 87 for retaining a compression spring 88. Flange 86 provides a bearing surface by which upward movement of disk 75 causes retraction of needle valve 53 from seat 55.

An upper valve seat insert 89 is sealed in housing 56' in axial alignment with the lower valve seat insert 83. Insert 89 includes a conical valve seat 54 and aligned bore communicating with the channel 57 which vents to the atmosphere. A cup-shaped recess 91 formed on the top exterior of housing 56', is partially filled with porous material 92 for filtering air admitted to housing 56'. An upper needle valve 52, constructed similarly to lower needle valve 53, including a body portion of triangular section and a conical point, cooperates with valve seat 54 to seal the interior of housing 56' from the atmosphere. An upper flange 94 and circular groove 95 faces the lower flange 86 to capture the upper end of compression spring 88. Needle valve 52 slides easily through an upper disk 96 which is secured by standards 76. The spacing between the facing surfaces of disks 75 and 96 is greater by a small amount than the spacing between the uppermost surface and the lowermost surface of flanges 94 and 86 when both needle valves 52 and 53 are firmly seated. A small amount of clearance is thus provided which must be taken up before motion of bobbin 47 commences to unseat one or the other of the needle valves 52 and 53. Such clearance introduces a small amount of hysteresis in the response of the modulator to control currents. The hysteresis scarcely impairs the performance of the control system because of the long thermal time constant in the air conditioning system and is a definite advantage in relaxing manufacturing tolerances both in the modulator and in the electronic circuit, since the differential currents in coil 46 need not be exactly balanced for zero temperature error signal. Assuming that the differential currents of coil 46 are balanced, or nearly so, the normal action of spring 88 is to urge both needle valves 52 and 53 into engagement with their respective valve seats. The pressure existing within the housing 56' at the time the coil currents became balanced will then be maintained indefinitely. The internal pressure of the modulator is at all times communicated to the actuator 13 of FIG. 2 by means of tubing attached to a fitting 97 sealed in the housing and containing a channel 59 forming an extension of the tubing bore. The upper housing portion 56' may be secured to the magnet body 49 by any suitable means, but for ease of assembly bolts may be passed upward from the magnet body through the side wall of housing 56' and the two housing portions drawn together against a sealing gasket 98 to provide an adequately tight seal.

Many modifications and variations are possible in the light of the above teachings. The invention may be practiced otherwise than as specifically disclosed without departing from the scope or spirit of the appended claims.

The invention claimed is:

1. A control system for an automobile air conditioner in which the automobile engine powers a refrigerant compressor and provides a source of vacuum *and further includes a refrigerant evaporator together with means for circulating air through said evaporator to provide cooled air and means for blending a controlled portion of said cooled air with air of high temperature to vary the temperature of air discharged from the air conditioner into the car*, comprising;

means for sensing the difference between a desired in-car temperature and the actual in-car temperature and for providing an electrical signal proportional to said temperature difference;

a vacuum modulator having a hermetic chamber with a first valve for admitting air from the atmosphere and a second valve for exhausting air from said chamber to the source of vacuum provided by the engine;

a vacuum actuator providing an output position proportional to the pressure within said hermetic chamber, the output position of said actuator [determining the heat transfer of said air conditioner] *controlling said blending means;* means providing an electrical signal proportional to the output position of said actuator;

means providing an electrical error signal proportional to the difference between said temperature difference signal and said output position signal; and means for controlling said first and second valves in accordance with said error signal.

2. In an automobile having an engine powered air conditioner and a source of engine vacuum, a system for controlling the air conditioner output, comprising;

a control member for adjusting the output of the air conditioner from maximum heating to maximum cooling according to its position;

means providing a first electrical signal representative of the position of said common member;

means providing a second electrical signal representative of the air conditioner output required to maintain a selected air temperature;

an amplifier providing an output proportional to the difference between said first and second signals, a hermetic chamber enclosing means producing a magnetic field, a coil operating within said field in response to output from said amplifier and producing a proportionate reciprocating motion of said coil. an inlet, an outlet positioned oppositely from said inlet, and valve means normally closing said inlet and said outlet and linked to said coil for alternate operation for opposite directions of coil motion;

means connecting said chamber inlet to the atmosphere;

means connecting said chamber outlet to the engine vacuum source;

an actuator for positioning said control member proportionately to the pressure of said chamber and means communicating the pressure of said chamber to said actuator.

3. A vacuum operated control system for an automobile air conditioner, comprising, a source of vacuum, an actuator having an expansible chamber and spring means urging said chamber to expand;

a control member positioned by said actuator to control the output of the air conditioner;

means providing an electrical signal representing the departure of the condition of the air within the automobile from a desired condition;

means providing an electrical signal representing the position of said control member;

means combining said condition signal and said position signal to produce an error signal;

a hermetic chamber having an inlet valve from the atmosphere, an outlet valve to said vacuum source, and means communicating the pressure within said hermetic chamber to said expansible chamber;

an electromechanical transducer including means producing a magnetic field and a coil operating in said field and to which said error signal is applied to cause motion of said coil; and means linking said coil to said valves of said hermetic chamber for operating said valves in accordance with said error signal.

4. A control system for an automobile air conditioner *having a refrigerant evaporator, a heater, a variable speed blower and means for diverting a variable portion of the air cooled by the evaprator through the heater and blending the air warmed by the heater with the undiverted portion of cooled air to vary the temperature of air discharged from the air conditioner,* comprising means supplying a first electrical quantity representing a desired air temperature, means supplying a second electrical quantity representing an actual air temperature;

a transducer for converting an electrical error signal into mechanical motion;

a hermetic chamber having a first valved opening to the atmosphere, a second valved opening to a source of vacuum and an outlet for transmitting the pressure within said chamber;

first and second valves operating in said first and second valve openings to control the pressure within said chamber, said valves being linked to said transducer;

an actuator including an expansible chamber and a control arm, said expansible chamber being connected to said outlet of said hermetic chamber for positioning said control arm proportionately to the pressure within said hermetic chamber said control arm being connected to control the *speed of said blower and said diverting means thereby determining the velocity and temperature of air discharged from* [output of] the air conditioner;

means providing a third electrical quantity representatime of the position of said control arm; and amplifying means for combining said first, second and third electrical quantities to produce an electrical error signal for said transducer.

5. A control system for an automobile air conditioner powered by the automobile engine which also provides a source of vacuum comprising:

an adjustable resistor, a temperature sensing resistor and a feedback potentiometer connected in a bridge circuit;

a differential amplifier for obtaining an error signal proportional to the difference between voltage from said feedback potentiometer and voltage derived from said resistors;

a permanent magnet, a coil receiving said error signal and reacting with said magnet to produce motion of said coil proportional to said error signal;

a vacuum modulator having a hermetic chamber, a first valve to the atmosphere, a second valve to the automobile engine vacuum source, a linkage connecting both of said valves to said coil and means normally urging both of said valves to a closed position in the absence of motion by said coil;

a vacuum actuator providing an output position proportional to applied pressure;

means transmitting the pressure within said modulator chamber to said actuator; and means linking said actuator to said feedback potentiometer to adjust said potentiometer in accordance with the output position of said actuator.

6. A control system as claimed in claim 5 wherein said differential amplifier is connected to produce a push-pull output and said coil is center-tapped for current flow from said amplifier in opposite directions in opposite halves of said coil.

7. A vacuum modulator for use in a control system for automobile air conditioners, comprising:

a hermetic housing;

an annular magnet in said housing;

a pole piece extending axially through the annulus of said magnet;

a bobbin slidably fitted on said pole piece;

a coil wound on said bobbin;

a first channel extending through said pole piece to the exterior of said housing;

a second channel positioned oppositely and spaced from said first channel and extending to the exterior of said housing;

first and second needle valves respectively sealing said first and second channels;

a first member secured to said bobbin and engaging said first needle valve to open said first channel upon movement of said bobbin in one direction; and a second member secured to said bobbin in spaced relationship to said first member and engaging said second needle valve to open said second channel upon movement of said bobbin in the direction opposite said one direction.

8. A vacuum modulator as claimed in claim 7 with additionally spring means urging said first and second needle valves to a closed position.

9. A vacuum modulator for use in a control system for an automobile air conditioner, comprising:

a hermetic housing;

a magnet within said housing;

a coil reacting with said magnet to produce reciprocating motion of said coil;

first and second openings in said housing oppositely positioned along the line of motion of said coil;

first and second needle valves respectively sealing said first and second openings, said valves terminating inwardly of said housing in flanged ends spaced from one another;

first and second members secured to said coil and slidably capturing said first valve and said second valve outwardly of the flanged ends thereof so as to open said valves alternately for alternate directions of motions of said coil; and spring means urging said first and second valves to a position to close said openings.

10. A vacuum modulator as claimed in claim 9 wherein the spacing between said first and second members exceeds the spacing between said valve flanges when both of said valves are closed.

11. A vacuum modulator for use in an automobile air conditioner control system, comprising:

a hermetic housing;

an annular magnet sealed at the bottom of said housing and occupying only a portion of the volume of said housing;

a pole piece axially positioned in the annulus of said magnet with peripheral spacing providing an air gap and having a first channel extending from the inward end of said pole piece to the exterior of said housing;

a first valve seat axially positioned in said pole piece at the inward end of said first channel a second channel at the top of said housing;

a second valve seat at the inward end of said second channel and axially spaced from said first valve seat first and second valve members reciprocating along the axis of said first and second valve seats and having spaced inwardly facing ends for independently seating in said first and second valve seats;

first and second valve operating members with fixed spacing relative to one another greater than the spacing between facing ends of said first and second valves when said valves are seated, said operating members independently carrying one or the other of said valves away from their respective seats, depending upon the direction of motion of said operating members;

a coil having connections for receiving electrical current from the exterior of said housing, said coil being coaxial with said pole piece and reciprocating in said air gap;

means securing the upper end of said coil to said first and second valve operating members to transmit coil motion thereto; and spring means urging said first and second valves into engagement with their respective seats.

References Cited

The following references, cited by the Examiner, are of record in the patented file of this patent or the original patent.

UNITED STATES PATENTS

| | | | |
|---|---|---|---|
| 3,183,962 | 5/1965 | Steinhagen et al. | 165—42 X |
| 1,790,547 | 1/1931 | La Pointe | 251—139 |
| 2,637,343 | 5/1953 | Matthews | 251—139 |
| 2,644,404 | 7/1953 | Bobo | 251—139 X |
| 2,992,541 | 7/1961 | Sutton | 165—26 X |
| 3,112,791 | 12/1963 | Brahm | 165—28 |
| 3,172,637 | 3/1965 | Adams et al. | 137—625.65 X |
| 3,178,151 | 4/1965 | Caldwell | 251—139 X |
| 3,232,312 | 2/1966 | Lanshy et al. | 251—139 X |

MANUEL A. ANTONAKAS, Primary Examiner

U.S. Cl. X.R.

137—625.65; 165—28; 251—139